United States Patent
Siomina

(10) Patent No.: US 9,516,570 B2
(45) Date of Patent: Dec. 6, 2016

(54) ENSURING POSITIONING QUALITY-OF-SERVICE DURING CELL CHANGES

(71) Applicant: Telefonaktiebolaget LM Ericsson (publ), Stockholm (SE)

(72) Inventor: Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 514 days.

(21) Appl. No.: 13/700,823

(22) PCT Filed: Sep. 18, 2012

(86) PCT No.: PCT/IB2012/054943
§ 371 (c)(1),
(2) Date: Nov. 29, 2012

(87) PCT Pub. No.: WO2013/150345
PCT Pub. Date: Oct. 10, 2013

(65) Prior Publication Data
US 2014/0080489 A1    Mar. 20, 2014

Related U.S. Application Data

(60) Provisional application No. 61/619,543, filed on Apr. 3, 2012.

(51) Int. Cl.
*H04W 36/00*    (2009.01)
*H04W 36/32*    (2009.01)
(Continued)

(52) U.S. Cl.
CPC .......... *H04W 36/32* (2013.01); *G01S 5/0036* (2013.01); *H04W 36/30* (2013.01); *H04W 64/00* (2013.01)

(58) Field of Classification Search
CPC ...... H04W 24/00; H04W 24/08; H04W 16/18; H04W 36/30; H04W 36/18; H04W 36/08
(Continued)

(56) References Cited

U.S. PATENT DOCUMENTS

2006/0187858 A1    8/2006    Kenichi et al.
2007/0243885 A1 *  10/2007   Shim .......................... 455/456.2
(Continued)

FOREIGN PATENT DOCUMENTS

CN    101998627 A  *  3/2011    ............ H04W 64/00
WO    2011126419 A1    10/2011

OTHER PUBLICATIONS

English Translation of WO2011017898A1, Hao Wu, Processing method and system when a handover occurs during a location process in a long term evolution network. Feb. 17, 2011.*
(Continued)

*Primary Examiner* — Nghi H Ly
(74) *Attorney, Agent, or Firm* — Murphy, Bilak & Homiller, PLLC

(57) ABSTRACT

Methods in a radio network node for assisting a positioning node during positioning of a target wireless device, wherein said positioning is based on radio measurements of uplink radio signals transmitted by the target wireless device, are disclosed. Corresponding radio network node apparatus are also described. An example method begins with detecting (210), at the radio network node, a cell change for the target wireless device. In response to the detected cell change, the radio network node selectively informs (230) a positioning node of the cell change. In some embodiments, the radio network node informs the positioning node only when there is a change in the transmission configuration in at least one cell or when measurements of the uplink radio signals cannot continue.

31 Claims, 5 Drawing Sheets

(51) Int. Cl.
*H04W 36/30* (2009.01)
*G01S 5/00* (2006.01)
*H04W 64/00* (2009.01)

(58) Field of Classification Search
USPC .......... 455/423, 422.1, 456.1, 404.2, 414.1, 418,455/437, 436, 442
See application file for complete search history.

(56) References Cited

U.S. PATENT DOCUMENTS

| | | | |
|---|---|---|---|
| 2009/0036146 A1 | 2/2009 | Lamba et al. | |
| 2009/0066564 A1* | 3/2009 | Burroughs et al. | 342/357.1 |
| 2010/0041418 A1 | 2/2010 | Edge et al. | |
| 2010/0322185 A1* | 12/2010 | Park et al. | 370/331 |
| 2011/0077007 A1* | 3/2011 | Kim | 455/436 |
| 2011/0183672 A1* | 7/2011 | Jeong et al. | 455/436 |
| 2011/0207477 A1 | 8/2011 | Siomina et al. | |
| 2012/0020320 A1 | 1/2012 | Issakov et al. | |

OTHER PUBLICATIONS

English Translation of CN101998627A, Hao Wu, Switching processing method and system in long term evolution network location. Mar. 30, 2011.*

3rd Generation Partnership Project. "On UL Positioning Parameters." 3GPP TSG-RAN WG4 Meeting #63, R4-123063, May 21-25, 2012, Prague, Czech Republic.

3rd Generation Partnership Project. "[Draft] LS response on UL positioning parameters." 3GPP TSG RAN WG4 meeting #63, R4-123065, Prague, Czech Republic, May 21-25, 2012.

Siomina, I. "Ensuring Positioning Quality-of-Service for LTE Positioning." Currently Pending U.S. Appl. No. 13/700,765, filed 29 Nov. 2012.

3rd Generation Partnership Project. 3GPP TS 36.305 V10.3.0 (Sep. 2011). 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10). pp. 1-51, Sep. 2011.

3rd Generation Partnership Project. "SRS update support in NBPS for LTE." 3GPP TSG-RAN2 Meeting #77bis, R2-121127, Mar. 26-30, 2012, Jeju, Korea.

3rd Generation Partnership Project. "LS on Uplink Positioning Reset Procedure." 3GPP TSG RAN WG2 meeting #77bis, R2-121954, Mar. 26-30, 2012, Jeju, Korea.

3rd Generation Partnership Project. "UTDOA support of Reset Procedure."3GPP TSG-RAN WG3 Meeting #76, R3-120954, May 21-26, 2012, Prague, Czech Republic.

3rd Generation Partnership Project. 3GPP TS 29.171 V11.1.0 (Mar. 2012). 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC);SLs interface (Release 11). Mar. 2012.

3rd Generation Partnership Project. "Network Based Positioning Support." 3GPP TSG-RAN WG2 Meeting #77, R2-121030, Dresden, Germany Feb. 6-10, 2012.

* cited by examiner

ENSURING POSITIONING QUALITY-OF-SERVICE DURING CELL CHANGES

TECHNICAL FIELD

The present invention relates generally to wireless communication networks and in particular to networks performing positioning measurements on uplink radio signal transmissions from wireless devices.

BACKGROUND

The development of technologies to determine the position of a mobile device has enabled application developers and wireless network operators to provide location-based and location-aware services. Examples of these are guiding systems, shopping assistance, friend finder, presence services, community and communication services and other information services that give the mobile user information about his or her surroundings or that use this information to enhance their services.

In addition to the commercial services facilitated by these technologies, location-based emergency services are also being deployed. The governments in several countries have put specific requirements on the network operators to be able to determine the position of an emergency call. For instance, governmental requirements in the United States specify that mobile networks must be able to determine the position of a certain percentage of all emergency calls and further include accuracy requirements. The requirements make no distinctions between indoor and outdoor environment.

In many environments, the position can be accurately estimated by using positioning methods based on Global Navigation Satellite Systems (GNSS), such as the well-known Global Positioning System (GPS). However, GPS-based positioning may often have unsatisfactory performance, especially in urban and/or indoor environments. Complementary positioning methods may also be provided by a wireless network to augment GPS technology. In addition to mobile terminal-based GNSS (including GPS), the following methods are currently available or will be soon be included in the Long-Term Evolution (LTE) standards developed by the $3^{rd}$-Generation Partnership Project (3GPP):

Cell ID (CID),
E-CID, including network-based angle-of-arrival (AoA),
Assisted-GNSS (A-GNSS), including Assisted-GPS (A-GPS), based on satellite signals,
Observed Time Difference of Arrival (OTDOA),
Uplink Time Difference of Arrival (UTDOA)—being currently standardized.

Several positioning techniques are based on time-difference-of-arrival (TDOA) or time-of-arrival (TOA) measurements. Examples include OTDOA, UTDOA, GNSS, and Assisted-GNSS (A-GNSS). A typical, though not the only, format for the positioning result with these techniques is an ellipsoid point with an uncertainty circle/ellipse/ellipsoid, which is the result of intersection of multiple hyperbolas/ hyperbolic arcs (e.g., OTDOA or UTDOA) or circles/arcs (e.g., UTDOA, GNSS, or A-GNSS).

Several techniques, such as Adaptive Enhanced Cell Identity (AECID), may involve a mix of any of the methods above, and are thus regarded as "hybrid" positioning methods. With these methods, the position result can be almost any shape, but in many cases it is likely to be a polygon.

Cellular-based positioning methods (as opposed to satellite-based methods, for example) rely on knowledge of anchor nodes' locations, i.e., the fixed locations from which measured signals are transmitted (e.g., for OTDOA) or the fixed locations at which signals transmitted by mobile devices are measured (e.g., for UTDOA). These fixed locations may correspond, for example, to base station or beacon device locations for OTDOA, Location Measurement Unit (LMU) antenna locations for UTDOA, and base station locations for E-CID. The anchor nodes' location may also be used to enhance AECID, hybrid positioning, etc.

Uplink Positioning

In 3GPP, location-based services are known as Location Services (LCS). Three key network elements in an LTE positioning architecture are the LCS Client, the LCS target and the LCS Server. The LCS Server is a physical or logical entity that manages positioning for a LCS target device by collecting measurements and other location information, assists the target device in measurements when necessary, and estimating the LCS target location. A LCS Client is a software-based and/or hardware entity that interacts with a LCS Server for the purpose of obtaining location information for one or more LCS targets, i.e., the entities being positioned. LCS Clients may reside in a network node, an external node (i.e., a network external to a cellular network), a Public Safety Access Point (PSAP), a user equipment (or "UE," 3GPP terminology for an end-user wireless station), a radio base station, etc. In some cases, the LCS Client may reside in the LCS target itself. An LCS Client (e.g., an external LCS Client) sends a request to LCS Server (e.g., a positioning node) to obtain location information. The LCS Server processes and services the received requests and sends the positioning result (sometimes including a velocity estimate) to the LCS Client.

In some cases, the position calculation is conducted by a positioning server, such as an Enhanced Serving Mobile Location Center (E-SMLC) or a Secure User-Plane Location (SUPL) Location Platform (SLP) in LTE. In other cases, the position calculation is carried out by the UE. The latter approach is known as the UE-based positioning mode, while the former approach includes both network-based positioning, i.e., position calculation in a network node based on measurements collected from network nodes such as LMUs or eNodeBs, and UE-assisted positioning, where the position calculation in the positioning network node is based on measurements received from UE.

LTE Positioning Protocol (LPP) is a positioning protocol for control plane signaling between a UE and an E-SMLC, which is used by the E-SMLC to provide assistance data to the UE and by the UE for reporting measurements to the E-SMLC. LPP has been designed in such a way that it can also be utilized outside the control plane domain such as in the user plane in the context of SUPL. LPP is used for DL positioning.

LTE Positioning Protocol Annex (LPPa), sometimes referred to as LTE Positioning Protocol A, is a protocol between the eNodeB and the E-SMLC, and is specified only for control-plane positioning procedures, although it still can assist user-plane positioning by querying eNodeBs for information (e.g., PRS configuration in a cell for OTDOA or UE SRS configuration for UTDOA) and/or eNodeB measurements. LPPa may be used for DL positioning and UL positioning.

FIG. 1 illustrates the UTDOA architecture currently under discussion in 3GPP, including nodes found in the Radio Access Network (RAN) and the core network, as well as an external LCS Client. Although uplink (UL) measurements may in principle be performed by any radio network node, such as the illustrated LTE eNodeB 110, the UL positioning architecture also includes specific UL measurement units, known as Location Measurement Units (LMUs), which are logical and/or physical nodes that measure signals transmitted by a target UE, such as the UE 130 illustrated in FIG. 1. Several LMU deployment options are possible. For example, referring to FIG. 1, LMU 120a is integrated into eNodeB 110, while LMU 120b shares some equipment, e.g., at least antennas, with eNodeB 110. LMU 120c, on the other hand, is a standalone physical node comprising its own radio components and antenna(s).

While the UTDOA architecture is not finalized, there will likely be communication protocols established for communications between a LMU and positioning node, and there may be some enhancements to support UL positioning added to the existing Location Position Protocol Annex (LPPa) or to similar protocols. LPPa is a protocol between an eNodeB and an LCS Server specified only for control-plane positioning procedures, although it can be used to assist user-plane positioning by querying eNodeBs for information and eNodeB measurements.

In particular, a new interface between the E-SMLC and LMU is being standardized for uplink positioning. This interface, known as SLm, is terminated between a positioning server, e.g., the E-SMLC 140 pictured in FIG. 1, and an LMU. It is used to transport messages according to the SLmAP protocol, a new protocol being specified for UL positioning, between the E-SMLC and the LMU. SLmAP can be used to provide assistance data to an LMU, as discussed in further detail below. This protocol amy also be used by the LMU to report to the E-SMLC results of measurements on radio signals performed by the LMU. The SLmAP protocol was previously referred to as the LMUp protocol; thus is should be understood that references herein to SLmAP are referring to a developing protocol referred to as LMUp elsewhere.

In LTE, UTDOA measurements, known as UL relative time-of-arrival (RTOA) measurements, are performed on Sounding Reference Signals (SRS). To detect an SRS signal, an LMU 120 needs a number of SRS parameters to generate an SRS sequence that is correlated against the received signal. These parameters are not necessarily known to LMU 120. Thus, to allow the LMU to generate the SRS sequence and detect the SRS signals transmitted by a UE, SRS parameters must be provided in the assistance data transmitted by the positioning node to LMU; these assistance data would be provided via SLmAP. However, the SRS parameters are also generally unknown to the positioning node, which therefore must obtain this information from the eNodeB that configured the target UE to perform the SRS transmissions to be measured by the LMU; this information would have to be provided to the positioning node via LPPa or a similar protocol.

The specific contents of the assistance data provided to LMUs by a positioning node, over SLmAP, are currently being discussed in 3GPP. One intention of the assistance data is to indicate the SRS configuration for the uplink signals that the LMUs will measure. One example of the specific assistance data that might be provided to an LMU by a positioning node, using SLmAP, is shown in Table 1. This assistance data, which can be based on information provided to the E-SMLC by an eNodeB, can be used by the LMU to configure UL RTOA measurements, for example.

TABLE 1

| Parameter Category | Parameters |
| --- | --- |
| General | C-RNTI |
| | Serving eNB eCGI, PCI |
| | UL-EARFCN |
| | Cyclic prefix Config |
| | UL-Bandwidth |
| SRS | Bandwidth |
| | Sub-frame configuration |
| | Frequency domain position |
| | Cyclic shift |
| | Duration |
| | Transmission comb |
| | Configuration index |
| | MaxUpPts |

Since the eNodeB is configuring UE transmissions in general, including the SRS transmissions, it has to communicate to the positioning node the configuration information for the UL transmissions to be measured for UL positioning. It has been proposed that the same configuration information signaled to LMUs by the positioning node is proposed to be also signaled from the eNodeB to the E-SMLC.

Measurements for UL positioning and UTDOA are performed on UL transmissions, which may include, for example, reference signal transmissions or data channel transmissions. UL RTOA is the currently standardized UTDOA timing measurement, and may be performed on Sounding Reference Signals (SRS). The results of the measurements are signaled by the measuring node (e.g., LMU) to the positioning node (e.g., E-SMLC), e.g., over SLmAP.

A positioning result is a result of processing of obtained measurements, including Cell IDs, power levels, received radio signal strengths or quality, etc. The positioning result is often based on radio measurements (e.g., timing measurements such as timing advance and RTT or power-based measurements such as received signal strength) received from measuring radio nodes (e.g., UE or eNodeB or LMU).

The positioning result may be exchanged among nodes in one of several pre-defined formats. The signaled positioning result is represented in a pre-defined format, e.g., corresponding to one of the seven Universal Geographical Area Description (GAD) shapes. Currently, a positioning result may be signaled between:
  an LCS target, e.g., a UE, and an LCS server, e.g., over LPP protocol;
  two positioning nodes, e.g., an E-SMLC or SLP, e.g., over a proprietary interface;
  a positioning server (such as an E-SMLC,) and other network nodes, e.g., a Mobility Management Entity (MME), a Mobile Switching Center (MSC), a Gateway Mobile Location Center (GMLC), an Operations and Maintenance (O&M) node, a Self-Organizing Network (SON) node, and/or a Minimization of Drive Tests (MDT) node;
  a positioning node and an LCS Client, e.g., between an E-SMLC and a Public Safety Access Point (PSAP), or between an SLP and an External LCS Client, or between an E-SMLC and a UE.
Note that in emergency positioning, the LCS Client may reside in a PSAP.

The LCS positioning quality in a positioning result is controlled by target quality requirements known as positioning quality-of-service (QoS), LCS QoS, or target LCS QoS. Positioning QoS may be described by any one or more of: a target horizontal uncertainty, a target vertical uncertainty, and a target response time. The uncertainty information, either horizontal or vertical, typically comprises an accuracy level and a corresponding confidence level.

The specific LCS QoS for a given positioning event depends on the service that is requesting positioning. There may also be pre-defined QoS configurations for specific LCS Client Types and/or LCS Service Types. The LCS QoS may be signaled by a LCS Client to other nodes. In LTE, an E-SMLC may receive this information from an MME, which in turn may receive it from GMLC.

For positioning techniques based on downlink measurements, the LCS QoS is communicated to a UE performing positioning measurements. More specifically, in the existing LTE specifications, it is signaled from E-SMLC to UE over LPP in the commonIEsRequestLocationInformation element to control UE-based positioning (i.e., when the positioning result is calculated by the UE; currently, for LTE there is only one standardized UE-based positioning method—A-GNSS) and it is essentially the information received by E-SMLC in a positioning request for the UE. The specifications require that QoS requirements shall be met by the target device to the degree possible. However, it is permitted to return a response that does not fulfill all QoS requirements, if some were not attainable. The single exception to this is the response-time requirement, which must always be fulfilled—even if that means not fulfilling other QoS requirements.

As mentioned above, the LCS QoS is also communicated between network nodes, in addition to being communicated to the UE for downlink UE-based positioning. The positioning node (e.g., the E-SMLC for control-plane positioning) receives a positioning request in an LCS-AP request message from the MME. This message is sent by the MME to request a location estimate for a target UE and contains sufficient information, including LCS QoS information, to enable location according to the target QoS, using any positioning method supported. The message is also used to request LCS assistance data transfer to a UE. This message is specified in the 3GPP document "Location Services (LCS); LCS Application Protocol (LCS-AP) between the Mobile Management Entity (MME) and Evolved Serving Mobile Location Centre (E-SMLC); SLs interface," 3GPP TS 29.171, v. 11.1.0 (March 2012), available at www.3gpp.org. In particular, this Location Request Message includes LCS QoS parameters, which may specify horizontal accuracy, vertical accuracy and allowed response time for the requested positioning.

Positioning measurements are complicated by the recent development of multi-carrier techniques for cellular networks. A multi-carrier system, alternatively called a carrier aggregation (CA) system, allows a UE to simultaneously receive and/or transmit data over more than one distinct and separately configured carrier frequency. Each carrier frequency is often referred to as a component carrier (CC) or is referred to simply as a serving "cell" in the serving sector. More specifically, an individual carrier may be referred to as a primary serving cell or a secondary serving cell.

The multi-carrier concept is used in both High-Speed Packet (HSPA) systems and LTE systems. Carrier aggregation, or CA, is supported for both contiguous and non-contiguous component carriers. Carriers originating from the same eNodeB need not to provide the same coverage. Carriers in a multi-carrier system may also belong to different radio access technologies (RATs).

For a UE in RRC_CONNECTED mode that is not configured with CA, there is only one serving cell comprising of the primary cell. For a UE in RRC_CONNECTED mode and configured with carrier aggregation, the term "serving cells" is used to denote the set of one or more cells configured for the UE, which include the primary cell and all secondary cells.

The primary cell (PCell) is a configured cell, operating on the primary carrier frequency, also referred to as the primary component carrier (PCC), in which the UE either performs the initial connection establishment procedure or initiates the connection re-establishment procedure, or the cell indicated as the primary cell in the handover procedure. A secondary cell (SCell) is a cell, operating on a secondary carrier frequency, also referred to as a secondary component carrier (SCC), which may be configured after an RRC connection is established, and which may be used to provide additional radio resources in either the uplink or downlink directions, or both.

In the downlink, the carrier corresponding to the PCell is the Downlink Primary Component Carrier (DL PCC), while in the uplink it is the Uplink Primary Component Carrier (UL PCC). Depending on UE capabilities, SCells can be configured to form, together with the PCell, a set of serving cells. In the downlink, the carrier corresponding to an SCell is a Downlink Secondary Component Carrier (DL SCC), while in the uplink it is an Uplink Secondary Component Carrier (UL SCC). A set of configured serving cells in CA always includes one PCell and one or more SCells. The configured sets may be different in DL and UL.

In a CA system, the base station (e.g., eNode B) in LTE can selectively activate and deactivate one or more secondary cells on the corresponding secondary carriers. Thus, a secondary carrier may be selectively configured and deconfigured, and an activated secondary carrier may be selectively activated and deactivated. The UE may perform measurements on configured but not activated SCCs; however, the UE can transmit only on configured and activated SCCs. SCCs may be activated and deactivated dynamically. The activation and deactivation is done by the eNodeB using lower layer signaling (e.g., over PDCCH in LTE) using a short command such as ON/OFF, e.g., using 1 bit for each SCell. The activation/deactivation command is sent to the UE via the PCell. Typically deactivation is done when there is no data to transmit on the SCell(s). The activation/deactivation can be done independently on uplink and downlink SCell. One purpose of the deactivation is to enable UE battery saving.

While current standards for LTE specify the use of LCS QoS information for downlink measurements, improvements to uplink positioning techniques are needed.

SUMMARY

With uplink (UL) positioning as it is currently defined in the 3GPP standards for LTE, there are currently no techniques for ensuring positioning QoS during a cell change occurring while a positioning measurement on UL radio signals is performed, in either carrier-aggregation (CA) systems or non-CA systems. In fact, standardization of UL positioning architecture, exploiting UL measurements, is not yet complete, hence there are no means for optimizing its performance either. Described below are technical solutions to address one or more of these issues. These solutions include methods in a radio network node for detecting cell changes and informing a positioning node of the cell change, as well as complementary methods in a positioning node for receiving an indication of a cell change for a target wireless device and selectively requesting a restart of uplink positioning measurements for one or more uplink transmissions transmitted by the target wireless device, in response. Corresponding apparatus are also described in detail.

An example method according to several embodiments of the present invention is for assisting positioning of a target wireless device, such as a UE, where the positioning is based on radio measurements of uplink, UL, radio signals transmitted by the target wireless device, and might be implemented in a radio network node, such as an eNodeB or an LMU. This example method begins, in some embodiments, with a determination of whether there has been a cell change for a target wireless device. In various embodiments, one or several types of cell changes are detected by the radio network node, including, for example: a change of the serving cell; a change to a set of serving cells; a primary cell, PCell, change; a change in carrier for at least one cell; and an activation or deactivation of a cell or a carrier. In some cases, the detecting is carried out while positioning measurements are being performed on uplink transmissions from the target cell, either by the radio network node or by a separate measuring node. The uplink transmissions can be, for example, reference signal transmissions, such as sounding reference signals, or data transmissions, such as PUSCH transmissions, or control transmissions, such as PUCCH transmissions.

If a cell change is detected, the example method may continue, in some cases, with an optional step of determining whether positioning measurements can continue after the cell change. In these embodiments, if all or a sufficient set of positioning measurements can continue, then there is no need for further action, and the radio network node returns to monitoring for additional cell changes.

If the optional operation summarized above is not performed at all, or if positioning measurements cannot continue due to the cell change, then the process continues with the radio network node informing a positioning node of the cell change. In some cases this may be done selectively, depending on the type of cell change. For instance, in some embodiments a cell change involving secondary cell changes may not trigger a report to the positioning node, while all serving cell changes do. In other embodiments, serving cell changes that do not result in the unavailability of one or more measured uplink transmissions will trigger a report to the positioning node, while all other types of cell changes do.

In some embodiments, informing the positioning node of the cell change includes informing the positioning node of a type of the cell change, e.g., whether the detected cell change is a change of the serving cell, a change to a set of serving cells, a change in Pcell, a carrier change or carrier switching for at least one cell, a handover, or an activation or deactivation of a cell or a carrier. In some of these and in some other embodiments, the radio network node sends an indication about an on-going positioning session to a target cell, such as when the cell change involves a handover to the target cell. This operation is also optional, since it need not be implemented in every embodiment of the techniques described herein. In some cases, this indication about the on-going positioning session includes positioning QoS information for the target wireless device.

Another example method for assisting positioning of a target wireless device, complementary to the methods summarized above, can be implemented in positioning node such as an E-SMLC. This method begins with the receiving of a cell change indication, which may be, for example, the informing of a cell change sent by a radio network node. In some cases, if a cell change is detected, the method continues with an optional step of determining whether positioning measurements can continue after the cell change. In these embodiments, if all or a sufficient set of positioning measurements can continue, then there is no need for further action, and the process starts over.

If this optional operation is not performed at all, or if positioning measurements cannot continue due to the cell change, then the process continues with a request to restart uplink positioning measurements for one or more uplink transmissions transmitted by the target wireless device. In some cases, positioning measurements for one configuration of uplink transmissions can continue, while positioning measurements for another configuration of uplink transmissions cannot, e.g., when reference signal transmissions on a given cell/carrier are terminated. In some cases, then, the positioning node selectively requests a restart of uplink positioning measurements for one or more UL transmissions, even after first determining that uplink positioning measurements for at least a first configuration of uplink transmissions can continue after the indicated cell change, where a restart of uplink positioning measurements for at least a second configuration of uplink transmissions is requested.

Finally, the example method continues, in some embodiments, with an optional step of providing new or updated uplink transmission configuration data for one or more cells to a measuring node, such as an LMU. This operation is not necessarily implemented in all positioning nodes configured according to the techniques described above, nor is it necessarily performed in every instance in those positioning nodes that at least sometimes perform it.

Radio network node apparatus adapted to carry out several of the techniques summarized above, and variants thereof, are also disclosed in the detailed discussion that follows. In addition, positioning node apparatus are also described. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
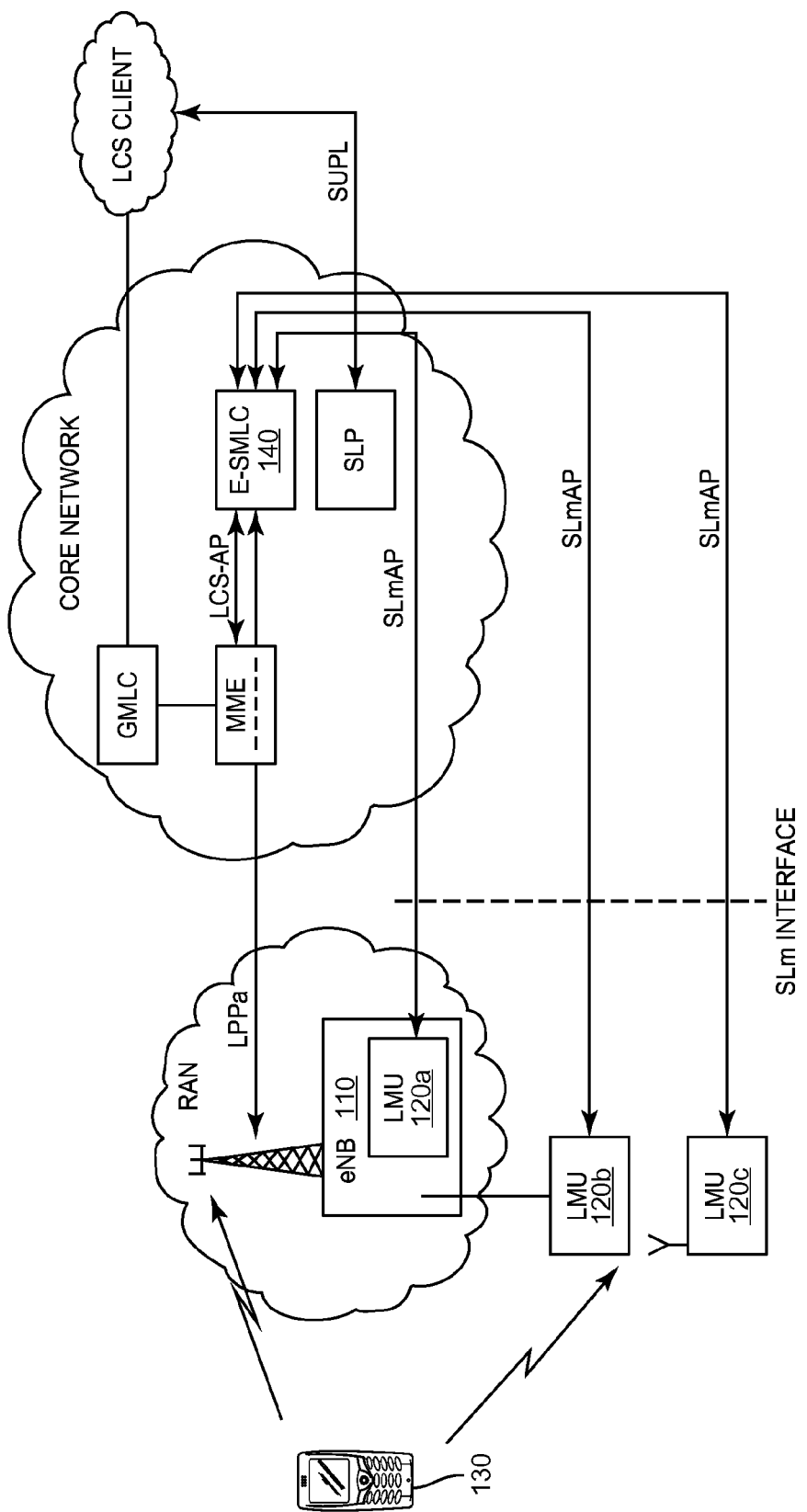
FIG. 1 illustrates several nodes in an example network configured according to the LTE positioning architecture.

Note that although terminology from 3GPP LTE is used in this disclosure to exemplify the invention, this should not be seen as limiting the scope of the invention to LTE systems or systems using the LTE Radio Access Technology (RAT). Other wireless systems, including those based on WCDMA, WiMAX, UMB and GSM, may also benefit from exploiting the ideas covered within this disclosure. Furthermore, the inventive techniques disclosed herein are not limited to single-RAT systems, but may also be applied in the multi- RAT context. Some other RAT examples are LTE-Advanced, UMTS, HSPA, GSM, cdma2000, WiMAX, and WiFi.

Still further, the techniques and apparatus described herein may be considered as standalone embodiments or may be used in any combination with each other, unless their descriptions herein clearly indicate otherwise.

The terms "wireless device" and "UE" are used interchangeably in the description that follows. A UE may comprise any device equipped with a radio interface and capable of at least generating and transmitting a radio signal to a radio network node. Note that some radio network nodes, e.g., a femto base station, or "home base station," may be equipped with a UE-like interface, and in some cases may need to be positioned in the same manner as UEs are positioned. Examples of UEs that are to be understood in a general sense are wireless PDAs, wireless-equipped laptop computers, mobile telephones, wireless sensors, fixed relay nodes, mobile relay nodes, and any radio network node equipped with a UE-like interface (e.g., small RBS, eNodeB, femto BS).

A "radio node" is characterized by its ability to transmit and/or receive radio signals, and comprises at least a transmitting or receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a wireless sensor, a beacon device, a measurement unit capable of transmitting downlink signals (e.g., LMUs), a user terminal, a wireless PDA, a mobile telephone, a smartphone, a wireless-equipped laptop, etc.

A "radio network node" is a radio node in a radio communications network and is typically characterized by having its own network address. For example, a mobile device in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A). A radio network node, including eNodeB, RRH, RRU, LMU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells).

A "network node" may be a radio network node or a core network node. Some non-limiting examples of a network node are an eNodeB, a Radio Network Controller (RNC), a positioning node, an MME, a PSAP, a SON node, an MDT node, and an O&M node. A "coordinating node," as described below may be but is not necessarily a network node.

A "positioning node" as described in several embodiments herein is a node that has positioning functionality. For example, for LTE it may be understood as a positioning platform in the user plane (e.g., SLP in LTE) or a positioning node in the control plane (e.g., E-SMLC in LTE). An SLP may also consist of a SUPL Location Center (SLC) and a SUPL Positioning Center (SPC), where the SPC may also have a proprietary interface with E-SMLC. Positioning functionality may also be split among two or more nodes. For example, there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node" as used herein is a network and/or node that coordinates radio resources with one or more radio nodes. Examples of a coordinating node are a network monitoring and configuration node, an OSS node, an O&M node, an MDT node, a SON node, a positioning node, an MME, a gateway node such as Packet Data Network Gateway (P-GW) or Serving Gateway (S-GW) network node or femto gateway node, a macro node coordinating smaller radio nodes associated with it, an eNodeB coordinating resources with other eNodeBs, etc.

The signaling described below in connection with various embodiments of the invention is either via direct links or logical links (e.g., via higher layer protocols and/or via one or more network and/or radio nodes). For example, signaling from a coordinating node may pass through another network node, e.g., a radio network node.

The technical embodiments described herein are described primarily in the context of uplink (UL) positioning, i.e., positioning techniques based on measurements of uplink transmissions. The most typical example of such a positioning method is UTDOA, but the techniques described herein may be applied to other UL positioning approaches as well. UL measurements may be timing measurements (e.g., time of arrival, UE Rx-Tx, eNodeB Rx-Tx, RTT, propagation delay, time-difference of arrival) or power-based measurements (e.g., received signal strength or received signal quality).

A "configuring node" as described in at least some embodiments herein is a radio network node that configures UL transmissions for a UE, typically the serving cell (or PCell) node. A "measuring node" (sometimes referred to as an "assisting radio node") as described in at least some embodiments herein is a radio network node that performs UL measurements on the configured UL transmissions for the UE. Note that a configuring node may also be a measuring node.

For UL positioning, a positioning node typically requests or indicates a need for a configuring node (typically a serving cell) to provide information about UL transmissions for one or more wireless devices and/or to configure the UL transmissions, e.g., when not yet configured. The positioning node selects a set of measuring nodes for positioning a UE, and provides to them the information necessary for configuring measurement on the UL transmissions, the information comprising transmission configuration data.

Current Problems with UL Positioning

There are a number of problems with UL positioning as it is currently defined in the 3GPP standards for LTE. For instance, currently it is not possible to signal the LCS QoS to an eNodeB, e.g., over LPPa. More generally, there is currently no possibility to provide the LCS QoS for a given positioning task to a radio network node at all, nor to any node which does not calculate the location of the target UE. Thus:

It is not possible to provide the LCS QoS to a radio network node, such as the eNodeB, that is configuring a UE for UL positioning measurements by the eNodeB.

It is not possible to provide the LCS QoS to a radio network node, such as the eNodeB, that is configuring a UE for UL positioning measurements performed by a measuring entity different from eNodeB, such as an LMU. Note that an LMU may be a logical node which may have different physical implementation, e.g., this LMU may be a standalone LMU, an LMU sharing radio with eNodeB, or an LMU integrated into the eNodeB.

It is not possible to provide the LCS QoS to a radio network node, such a radio network node that is different from eNodeB such as LMU, e.g., for configuring measurements at the LMUs It is not possible to provide the LCS QoS to a radio network node for use in UL positioning and E-CID positioning or other positioning methods using E-CID measurements such as AECID, RF pattern matching, fingerprinting.

It is not possible to provide the LCS QoS over LPPa or SLmAP.

In addition, there are presently no techniques for using the LCS QoS information in the radio network node. Still further, there is no possibility to request a confidence level in the request sent to E-SMLC, e.g., via LCS-AP. Note that this problem has consequences that are not limited to UL positioning. Even further, there are currently no techniques for ensuring positioning QoS during a cell change, in either carrier-aggregation (CA) systems or non-CA systems.

Described below, then, are technical solutions to address one or more of the problems noted above. These technical solutions include:

Methods in the radio network node for obtaining the LCS QoS information.
Methods in the radio network node for using the LCS QoS information.
Methods in a positioning node
Methods for ensuring positioning QoS during cell change.
Enhanced signaling means for communication between positioning node and radio network node.

Obtaining and Using LCS QoS Information in a Radio Network Node

According to several embodiments, a radio network node is adapted to receive LCS QoS information from another network node. The radio network node then uses the LCS QoS information to perform at least one action responsive to the received LCS QoS information.

The LCS QoS information may be received via a direct communication link (e.g., a fixed link, a radio link, etc.) or a logical link to another network node (e.g., via higher-layer protocols that may be transparent to a third node, such as a MME or gateway node) or via a third node or UE. Receiving the information via a third node or UE may also be transparent to the third node or the UE (e.g., in a transparent container).

An example of a radio network node that may be adapted in this manner is an eNodeB, or a radio base station in general. Another example of a radio network node that may be adapted in this manner is an LMU. Examples of the network node from which the LCS QoS information is received are a positioning node (e.g., an E-SMLC or SLP), an MDT node, a gateway, a coordinating node, a core network node (e.g., an MME), an external LCS Client, and another radio network node (e.g., eNodeB or LMU). Communication between eNodeBs may be via the X2 interface standardized by 3GPP. Communication between eNodeB and LMU may be via X2 or another interface (which may also be a proprietary interface), or via another node or UE.

In one example, LCS QoS may be provided by the positioning node to an eNodeB by means of the LPPa protocol. For example, the LCS QoS information may be provided in a message that requests delivery of UE configuration data from the eNodeBs to the positioning node for support of uplink positioning, e.g., in support of UTDOA positioning. The message may be called UPLINK INFORMATION REQUEST or UTDOA INFORMATION REQUEST, for example. The message may also be an enhanced LPPa request message for supporting UL positioning (e.g., UTDOA) as described in further detail below. In another example, LCS QoS may be provided by the positioning node to LMU, e.g., by means of the SLmAP protocol.

In some cases, the LCS QoS may be obtained by the radio network node from a UE. In a special example, the LCS QoS information is received via the UE from another network node, in a transparent (to the UE) container.

The LCS QoS may be received by the radio network node in different ways and for different reasons. For example, the LCS QoS may be received upon request, or upon an indication for a need for this information sent from the radio network node. Alternatively, the LCS QoS may be unsolicited, e.g., where the sending is initiated by the sending node such as positioning node. The LCS QoS may also be sent according to a pre-defined procedure, e.g., as a part of the message flow during the information exchange related to retrieval UE configuration for UL positioning support. Combinations of these approaches are possible Transmission of the LCS QoS may also be triggered at the sending node by a particular triggering event, such as a handover, a cell change, carrier switching (e.g., with carrier aggregation), or by the receiving of a message of a pre-defined type (e.g., a location request; a location request associated with a certain positioning method, e.g., E-CID, UL positioning, UTDOA, network-based positioning; HO command). Transmission of the LCS QoS might also be triggered by a particular condition, e.g., based on a measured signal strength or quality, which may be compared to a threshold, or a measurement quality, which may be compared to a threshold, or a target position accuracy received in the positioning request has an accuracy of at least some threshold, or a target positioning QoS comprising measurement time below a threshold. Transmission of the LCS QoS might still further be triggered by a pre-defined rule, e.g., at a measurement restart after a cell change or a poor positioning result or poor-quality measurements, where "poor" may mean an error or uncertainty above a threshold. Combinations of these triggers are possible. Furthermore, a particular sending node may be configured to send the LCS QoS information in response to several of these triggering events, conditions, and/or pre-defined rules.

Receiving the LCS QoS at the radio network node may be in association with a particular positioning method, e.g., E-CID or UL positioning (e.g., UTDOA) or network-based positioning. The LCS QoS information (aka LCS QoS data) may comprise any one or more of several parameters, such as:

horizontal accuracy (e.g., minimum horizontal accuracy or target/desired horizontal accuracy),
confidence level corresponding to horizontal accuracy,
vertical accuracy (e.g., minimum vertical accuracy or target/desired vertical accuracy),
confidence level corresponding to vertical accuracy,
response time (e.g., maximum response time or target response time), measurement time (e.g., maximum measurement time or target measurement time), and Client Type or Service Type (e.g., there may be a pre-defined set of QoS parameters for certain LCS Clients such as emergency LCS Client).

Any of the LCS QoS parameters may be represented in terms of an absolute value (e.g., in meters or nanoseconds for accuracy or in seconds or milliseconds for response time), or a coded value (e.g., an index in range 0.127 or 'low'/'high' indicator).

In some embodiments, the LCS QoS format is the same as that used over LCS-AP protocol (i.e., the format received by the positioning node from MME). However, in other embodiments the LCS QoS format used to send the LCS QoS information sent to the radio network node may differ from that used over the LCS-AP protocol. In the latter case, for example, the positioning node may perform a transformation operation between the two formats. This transformation may be based, for instance, on a pre-defined rule or a pre-configured table. The transformation may also comprise adding one or more parameters that are not used in the format received by the positioning node. For example, LCS QoS received by the positioning node via LCS-AP from MME does not include confidence information; a positioning node may decide to include it in the LCS QoS format transmitted by the positioning node, in some embodiments of the present invention. In the case when the LCS QoS format transmitted by the positioning node is different from the format in which the positioning node receives the LCS QoS information, a transformation may also be needed when the positioning result, obtained on the LCS QoS format transmitted by the positioning node, is to be communicated to another node, such as when the positioning result is to be sent to the LCS Client that requested the UE positioning.

In some embodiments, a particular set of LCS QoS information is associated with one UE. In other embodiments, a given set of LCS QoS information is associated with more than one UE, e.g., so that one or several parameters of the LCS information apply to multiple UEs. In still other embodiments, separate LCS QoS information associated with each of multiple UEs may be included in a single message to the radio network node. Further, the same LCS QoS set of parameters for more than one UE may be comprised in the same message (e.g., UEs may be grouped by the LCS QoS).

Once the radio network node has received the LCS QoS information, it can use it for any of several purposes, including several uses that improve the ability of the measuring node to obtain measurements that will achieve the LCS QoS requirements. For example, upon receiving the LCS QoS information the radio network node may use the LCS QoS information for configuring at least one transmission of at least one UE. Examples of uplink transmissions that may be configured, based on the LCS QoS information include reference signal transmissions (e.g., SRS transmission or demodulation reference signals transmission), data transmissions (e.g., Physical Uplink Shared Channel, or PUSCH, transmissions), random access transmissions (e.g., Physical Random Access Channel, or PRACH), control channel transmission (e.g., Physical Uplink Control Channel, or PUCCH, transmissions).

The configuring of a transmission based on the LCS QoS information may comprise scheduling the transmission, rescheduling the transmission, configuring transmission bandwidth or frequency, configuring at least one parameter related to the at least one transmission. Examples of parameters related to SRS transmissions in LTE include:

PCI;
UL-EARFCN;
Duplex mode configuration;
UL cyclic prefix;
Cell-specific SRS bandwidth configuration srs-BandwidthConfig (see 3GPP TS 36.211);
UE-specific SRS bandwidth configuration srs-Bandwidth (see 3GPP TS 36.211);
number of antenna ports for SRS transmission srs-AntennaPort (see 3GPP TS 36.211);
SRS subframe configuration (see 3GPP TS 36.211);
frequency domain position (see 3GPP TS 36.211);
SRS frequency hopping bandwidth configuration (see 3GPP TS 36.211);
SRS-Cyclic shift (see 3GPP TS 36.211);
Transmission comb (see 3GPP TS 36.211);
SRS configuration index (see 3GPP TS 36.213);
MaxUpPt, used for TDD only (see 3GPP TS 36.211);
parameters related to enabling/disabling SRS sequence hopping or SRS sequence-group hopping;
parameter related to configuring aperiodic SRS;
transmit or measurement pattern of SRS;

Note that configuring of a transmission based on LCS QoS information may also comprise reconfiguring of an earlier configured transmission from the same UE. Configuring of a transmission may be performed according to a pre-defined rule that takes into account the received LCS QoS information. The rule may specify configuring such parameters as bandwidth (transmission or measurement bandwidth), transmission periodicity or transmission time, number of transmission samples available for measurements (e.g., a minimum number of transmission samples), etc. For example, the pre-defined rule may specify that:

The configured bandwidth is not less than a pre-defined value, e.g., specified by a measurement requirement or a mapping table. For instance, a high accuracy requested in the received LCS information may require at least X MHz or at least Y subcarriers.

The configured transmission periodicity is not larger than a pre-defined value, e.g., specified by a measurement requirement or a mapping table. For instance, a short measurement period requested in the received LCS information may require at most N milliseconds between two transmissions.

The configured number of transmissions is not less than a pre-defined value, e.g., specified by a measurement requirement or a mapping table. For instance, a certain accuracy level requested in the received LCS information may require at least N transmissions.

The number of transmit occasions indicated to the measuring node but where the signal is not actually transmitted (e.g., due to measurement gaps, turning off the receiver or switching it to another frequency, power consumption or transmit power reconfiguration, giving priority to other transmissions than the UL radio signal used for positioning measurements such as DL HARQ feedback transmissions transmitted in UL or PUCCH transmissions) should not exceed a certain number or a certain ratio of the total transmit occasions over a given time period. For instance, a requirement may specify that the number of subframes when the UE may suspend SRS transmissions, e.g., due to PUCCH or PUSCH or CSI transmissions, should not exceed X %. Note that the radio node responsive to such a requirement would have to adaptively schedule SRS, PUCCH, PUSCH or SCI or any DL transmission which would imply an UL transmission at a pre-defined time (e.g., due to HARQ process)

Another action that a radio network node may take in response to receiving LCS QoS information or based on obtained LCS QoS information is sending at least one of the configured transmission parameters discussed above to the UE or to another network node, such as a positioning node or another radio network node, e.g., an eNodeB or LMU.

In addition to or instead of using the LCS QoS information to configure uplink transmissions, the radio network node may also use the LCS QoS information to configure a receiver for receiving at least one transmission from at least one UE. The radio network node using the LCS QoS information for configuring its receiver and the radio network node using the LCS QoS information for configuring transmissions may be different physical nodes. The receiver of interest here may be the radio network node's own receiver or the receiver in another radio network node, such as in a separate LMU. In the latter case, configuring the receiver for receiving a transmission for one or more UEs, based on the LCS QoS information, includes Sending at least one of the parameters configured for the at least one transmission to the receiving node.

Examples of the at least one transmission for which the receiver may be configured include reference signal transmissions (e.g., SRS transmissions), data transmissions (e.g., PUSCH transmissions), and control channel transmissions (e.g., PUCCH transmission). Configuring a receiver may comprise, for example, scheduling the reception, rescheduling the reception, or configuring a reception bandwidth, measurement bandwidth, reception frequency, and/or measurement frequency. Note also that configuring of a receiver may also comprise reconfiguring of the receiver earlier configured to receive signals from the same UE.

Still another use for the LCS QoS information by a radio network node is in performing interference coordination. Thus, for example, a radio network node may be configured to do any one or more of the following:

Selectively schedule at least one transmission taking into account expected interference on the scheduled resources and the LCS QoS information. For instance, low-interference time- and/or frequency resources may be prioritized for scheduling when high accuracy and/or short measurement time is requested.

Reschedule other transmissions of the same or other UEs to enable low-interference resources responsive to the received LCS QoS information.

Selectively assign signal sequence parameters, e.g., sequence or scrambling code, hopping parameters, etc., responsive to the received LCS QoS.

Exchanging interference-related data to coordinate interference with neighbor cells or neighbor nodes for the time- and/or frequency resources that may be used for at least one transmission of the at least one UE for which the LCS QoS information was received. For instance, one radio node may indicate to the coordinating node or to the neighbor node a need to reduce interference from the neighbor cell or the neighbor node.

Still another use for the LCS QoS information by a radio network node is in initiating a handover or carrier switching procedure for at least one UE, responsive to the received LCS QoS information. For example, the UE for which the LCS QoS information was received may be handed over to another cell, to another carrier frequency, or to another RAT. Techniques related to this use are discussed in further detail below.

Finally, another use the LCS QoS information by a radio network node is in reporting a change in UE transmission configuration, including a termination of a particular UE transmission. The termination may occur, e.g., due to a cell change or resource optimization at the eNodeB, such as when other UEs' transmissions may be prioritized. Or, a termination may be due to a UE state change, or an eNodeB state change, or a cell state change, such as when a UE or eNodeB or cell changes between active and low-activity states such as DRX, DTX, power-saving, reduced transmission activity state, reduced-power activity state, etc.

Knowing the LCS QoS, the eNodeB according to some embodiments may also be adapted to determine the minimum required transmission configuration corresponding to the requested LCS QoS, including the transmission periodicity, bandwidth, number of transmissions, etc. In some of these embodiments, the eNodeB is adapted to report an early termination of UE transmissions in cases where the termination is determined to be early based on the LCS QoS and the transmissions that have been used for the measurement (e.g., during the time elapsed from configuring the transmissions to when the transmissions are reconfigured or stopped).

Knowing the LCS QoS, the eNodeB according to some embodiments may also be adapted to report a transmission configuration change that does not meet a minimum configuration requirement, e.g., has smaller BW and/or fewer transmissions available for measurements and/or larger periodicity, or to report a changed transmission configuration that is not a superset of the old configuration, e.g., where transmissions are more sparse with the new configuration. Either of these scenarios may cause positioning QoS degradation, and thus the eNodeB may inform another node (such as a positioning node) about such transmission configuration change. If a new configuration meets the minimum requirement and/or is a superset of the old configuration, on the other hand, e.g., the new bandwidth is larger than the minimum or the previous one or the transmissions become more dense while the old-configuration transmissions also occur or the number of transmissions is increased, there is no need to inform positioning node about the reconfiguration.

Ensuring LCS QoS During a Cell Change

LCS QoS information obtained by a radio network node can be used to help ensure that LCS QoS requirements are met during and after a cell change. Note that the techniques described here may be applied in combination with any of the solutions described above, and may further be combined with any of the signaling solutions described herein.

Here, the term "cell change" refers to a change in a cell or cells with which a UE is associated. Examples of a cell change include:

a serving cell change, e.g., at handover in a non-CA system or when the UE is not configured with any SCell;

a serving cell set change, e.g., an addition, removal, or change of a Scell in a CA system;

a PCell change, e.g., in a CA system, a change from a current PCell, having a first cell identity, to another cell, with a second cell identity; A cell change may occur during:

a handover (intra-frequency, inter-frequency or inter-RAT); or a PCell change on the same PCC (in a CA system); or an SCell change on a SCC (in a CA system); or a carrier switching event, in which the current PCC is changed to another carrier frequency, which also implies a PCell change.

A cell change may be due to any of several reasons, e.g., mobility, load balancing, energy saving, carrier activation/deactivation, etc.

According to several of the techniques described earlier, an eNodeB may be adapted to inform a positioning node when the configured SRS transmissions used for UL positioning are no longer available. This allows the positioning node to make a more informed choice as to how to proceed with the positioning request. Current positioning technologies do not take into account cell change scenarios arising in a carrier aggregation system, for example. Any of the cell changes described above is associated with the termination of an uplink transmission. As a result, the UL positioning measurements are likely to be restarted to meet the requested LCS QoS which will increase the response time.

However, when the UE is in carrier aggregation, the UL positioning measurements can continue at least in some cases where a cell change occurs, and thus the UL measurements may continue, at least in some cases. Accordingly, in some embodiments of the present invention, an eNodeB is adapted to inform a positioning node about a cell change only when UL transmissions cannot continue. The eNodeB may also be configured to indicate the type of a cell change and/or the change for a specific cell, e.g., PCell_old->PCell_new. In addition, or as an alternative, the positioning node may be configured to not request a measuring node (e.g., an LMU or eNodeB) to restart UL positioning measurements for the UL transmissions (on all CCs or a subset of CCs which have been measured for positioning prior the cell change) in situations where UL measurements can continue after a cell change. In addition, or as still another alternative, the positioning node may be adapted to not inform the measuring nodes about a cell change when the UL transmissions can continue. As still another alternative, a measuring node performing UL positioning measurements (e.g., an eNodeB or an LMU) may be adapted to continue UL positioning measurements after a cell change (if the UL transmissions can continue) for a UE for which the measurements are being performed, and/or to continue measurements using new or updated configuration information.

Such cases where measurements may continue after a cell change include, for example, the case when no SRS are configured on a serving cell that is changed. (Recall that there may be multiple serving cells with CA.) Other examples include when a cell change involves a serving cell that was previously receiving SRS transmissions, when the UL transmissions may continue on other serving cells.

In some embodiments of the present invention, when a cell change occurs, the eNodeB may provide the positioning node with the new or updated configuration of UL transmissions for one or more serving cells. In one example, the new or updated configuration of UL transmissions does not include the configuration of UL transmissions for cells where the configuration has not changed. In another example, the new or updated configuration of UL transmissions may include the configuration of UL transmissions for all cells which are still relevant for configuring measurements on the UL transmissions. These relevant cells may comprise cells for which UL transmission configuration was changed and cells for which UL transmission configuration was not changed but which are still relevant for measurements. This configuration data may be included in the same message that contains the indication about the cell change. This approach may apply for a UE in CA or non-CA UE, since, for example, co-located cells may be aware of the intra-site HO or connection reconfiguration and may also be aware of the transmission configuration in the other cell of the site, e.g., via cross-layer communication.

In still other embodiments, when a cell change occurs, e.g., due to a handover, the eNodeB may provide to the target cell (e.g., in the handover command message) an indication about the on-going positioning session. The indication may also comprise the LCS QoS information. This approach may be applied in both uplink and downlink positioning scenarios. With this approach:

sending the LCS QoS information to the new cell for the UE from the positioning node may be avoided, thus reducing unnecessary signaling overhead; and/or the target cell/eNodeB (new cell/eNodeB) may configure UL UE transmissions adaptively to the received LCS QoS information, and the delay until when the target eNodeB (new eNodeB after the cell change) configures the UE transmissions may be reduced; and/or the target cell/eNodeB (new cell/eNodeB) may configure downlink transmissions adaptively to the received LCS QoS information, thereby reducing the positioning response time; and/or the target cell/eNodeB (new cell/eNodeB) may provide the positioning node with the new configuration of UE transmissions without a request from the positioning node, which may reduce the overall positioning response time and signaling overhead; and/or the target cell/eNodeB (new cell/eNodeB) may provide the positioning node with its configuration of downlink transmissions without a request from the positioning node, which may reduce the overall positioning response time and signaling overhead.

It should be noted that the UE (or a target wireless device, in a broader sense) may adapt its uplink transmissions according to a pre-defined rule and/or according to the other nodes' behavior. For example, if it is known that UL measurements are expected to continue after a cell change, or after certain types of cell changes, then the UE transmitting UL signals (especially when the UL signals are configured specifically for these positioning measurements) may be adapted to continue UL transmissions after a cell change or after certain type of cell changes. The reverse may also be true—if for certain cell change scenarios or in certain conditions the UL positioning measurements are not expected to continue, the UE may be adapted to stop the UL radio signal transmissions (again, especially if the signals were configured specifically for these measurements). It may also be important to know whether the UL signals are being used by any network nodes for other purposes/measurements and whether it is permissible or advisable to stop the uplink transmissions.

Several of the above techniques may be used alone or in combination with one another to improve positioning QoS, e.g., accuracy and/or response time, when a cell change occurs. Some of the techniques may also apply for non-CA systems, and several are not limited to UL positioning (note also that some measurements involve both DL and UL transmissions, e.g., RTT or Rx-Tx measurements). Further, the UL transmissions are not limited to SRS transmissions, which were used as a non-limiting example above.

Enhanced LPPa for Supporting UL Positioning (e.g., UTDOA)

LPPa messaging for supporting UL positioning (e.g., UTDOA) or for a specific UL measurement (e.g., UL RTOA), is currently unspecified. In particular, the information exchange messages associated with UL transmissions are not yet finalized for uplink positioning. Here, parameters that potentially may be signaled in this message and pre-defined rules that may be associated with this message are described in more detail. Note that this message may also contain LCS QoS information, in some cases, including any of the detailed information described above.

UL positioning-related information for more than one UE may be included in the same message. Further, the same set of parameters for more than one UE may be included in the same message. For example, a list of UEs may be provided together with the list of the parameters that apply for all UEs in the list.

An LPPa message for UL positioning (e.g., a "request information" message or a "provide additional information" message) may include one or more of several features. For instance, such a message may include a request to configure a UE for UL positioning, e.g., comprising any one or more of:
- a request to configure a UE for UL positioning on specific carrier frequency(-ies) or specific component carrier(s) (CC in carrier aggregation) or specific RAT (which may or may not be the same as RAT in which the LPPa request message is received),
- a request to configure a UE for UL positioning on the entire set or a subset of carrier frequencies/CCs/RATs indicated in the message,
- a request to configure a UE for UL positioning on specific time domain resources,
- a request to configure a UE for UL positioning on specific frequency domain resources, Requested time- and/or frequency resources may be provided in an ordered list according to priorities, such as an ordered list of frequencies where the frequency priorities are decided based on the radio interface load (e.g., high transmission activity in the area may cause high interference and thus high load) and/or based on availability of assistance measuring nodes (e.g., LMUs). Requested/indicated set of time- and/or frequency resources may be determined based on the capabilities (e.g., frequency support or CA capability) of the assisting measuring nodes (e.g., LMUs) selected for UL positioning.

As another example, an LPPa message for UL positioning may include a request for UE configuration information for UL transmissions to be transmitted by the UE. For instance, this configuration information might be requested by the positioning node, in some embodiments. Another example of information that may be included in an LPPa message is an indication that pseudo ID or UE-specific SRS configuration may be used for UTDOA. For example, not all LMUs may be capable of using pseudo ID or UE-specific SRS; E-SMLC may thus obtain, by requesting or in unsolicited way from LMU or another node, this LMU capability and then determine accordingly the indication setting.

Still another example is an indication that a specific SRS configuration type is allowed, or an indication that a specific SRS configuration type is to be avoided. Some non-limiting examples of specific SRS configurations that might be referenced in this way are aperiodic SRS, SRS sequence hopping, and power-controlled SRS (with power control decoupled from PUSCH, e.g., a non-zero offset with respect to PUSCH). In some cases, no SRS configuration restriction is assumed by default, i.e., in the absence of a contrary indication received in an LPPa message. Note that a positioning node, in some embodiments according to this approach, determines whether SRS configuration restriction(s) are to be indicated to the configuring node (e.g., a serving eNodeB), based on assisting measuring node/LMU capability obtained from the measuring nodes/LMUs or other nodes, whether on request or pro-actively.

Yet other examples of information that may be included in an LPPa message for UL positioning include:
- an indication of the maximum measurement bandwidth (associated with a frequency) that may be configured for UL positioning. For instance, an E-SMLC selects a set of assisting LMUs and/or eNodeBs for measuring UE transmissions and determines the maximum supported measurement bandwidth among the assisting LMUs and/or eNodeBs. In some cases, this indication may be included in the message only when the maximum measurement bandwidth is smaller than the UL system bandwidth of the serving eNodeB, to reduce signalling overhead.
- a request for velocity information.
- a request for environment information, such as whether the environment is line-of sight or multi-path rich, or has urban- or rural-like propagation, or whether the deployment of the eNodeB is indoor or outdoor deployment.
- a request for a specific measurement. Some examples are a timing measurement (e.g., UE or eNodeB Rx-Tx, RTT, timing advance, etc.), a power-based measurement of signal (e.g., RSRP or received signal strength in UL, received signal quality in DL or DL), an interference measurement (e.g., RSSI or Iot), a direction measurement (e.g., AoA), and a power headroom measurement. Note that the requested measurement may be for the downlink or the uplink or both (note that, e.g., RTT and Rx-Tx are two-directional measurements), and/or may be an intra-frequency, inter-frequency, inter-RAT, or carrier aggregation measurement (e.g., a measurement on an SCell), or a CoMP measurement.
- a request for complementary ranging information. An example of complementary ranging information may be a measurement reflecting a distance or a propagation delay such as timing advance, timing advance Type 1 (see 3GPP TS 36.214), timing advance Type 2 (see 3GPP TS 36.214), UE Rx-Tx, eNodeB, Rx-Tx, RTT, etc.
- a request for radio channel related data.
- a request for radio fingerprint information, such as received signal strength in UL or DL, received signal quality in UL or DL, etc.

Any of the above information may be implicit, or explicitly signaled, and may be associated with one or a plurality of request messages. For example, an explicit request may comprise a corresponding indicator included in the request message. An implicit request may be determined by a pre-defined rule (i.e., no explicit indicator in the request message may be necessary). For example, such a pre-defined rule may specify that a timing advance measurement on PCell should always be included when available, or that available fingerprint information may be included if a particular timing measurement is not available.

Any of the above information may be provided by positioning node to eNodeB, for any of one or several reasons or schedules. For instance, the information may be provided:
pro-actively.
according to a pre-defined procedure, e.g., as a part of the message flow during the information exchange related to retrieval UE configuration for UL positioning support. For instance, the information may be sent as a part of a request to configure UL transmissions for positioning a UE.

upon a request for or an indication of a need for this information from eNodeB. For instance, an eNodeB may send a request for additional information, if necessary, after receiving a request to configure UL transmissions for positioning a UE.

upon one or several particular triggering events, such as a handover or SRS configuration change or suspension. Note that a positioning node, for example, may be notified about such event by a network node, such as by an MME via LCS-AP, or by a serving eNodeB handing over a UE, or by a serving eNodeB receiving a handed over UE, e.g., via LPPa. Such a notification may include new SRS configuration, in some cases.

to facilitate SRS configuration in a new cell upon a cell change. For instance, old SRS configuration may be signalled to a target cell, e.g., in a HO command). The positioning node may be notified about such event by a UE, for example, via LPP. The notification about such event may comprise new SRS configuration, in some cases.

upon a failure of another positioning method.

upon one or more triggering conditions, such as when the obtained UL positioning measurements on a certain frequency are of a low quality, or when the received SRS configuration does not meet a pre-defined rule, such as when the configured bandwidth provided by the eNodeB is below a pre-defined threshold and/or the configured periodicity or SRS transmission time is below a pre-defined threshold, where the pre-defined thresholds may be pre-defined based on measurement requirements. In some cases, upon such a trigger, positioning node may send a request with updated information, e.g., a new set of frequencies.

In view of the several techniques described above, it will be appreciated that FIG. 2 illustrates, in general terms, an example method for assisting positioning of a target UE, as might be implemented in a radio network node such as an eNodeB or an LMU. More particularly, the illustrated process can be used to ensure that positioning quality-of-service is maintained during and after a cell change.

Figure 2:
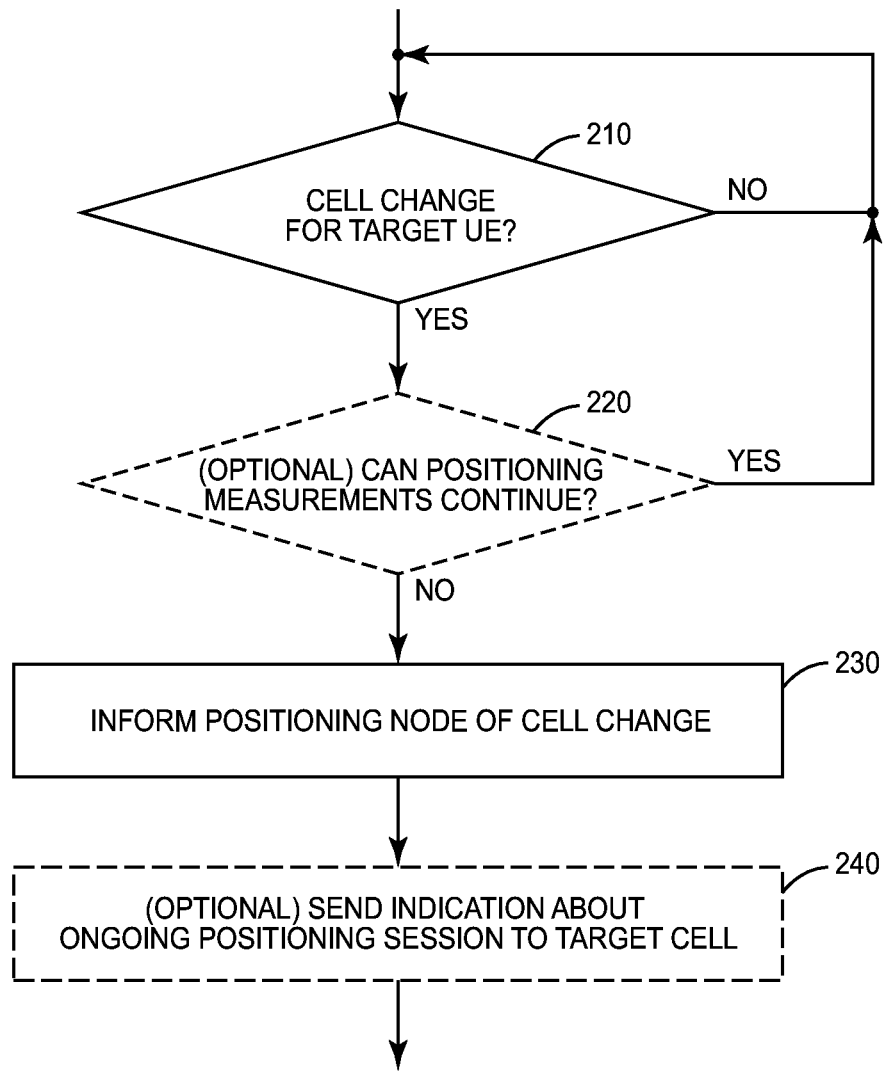
FIGS. 2, 3, and 4 are process flow diagrams illustrating example methods according to various embodiments of the present invention.

Referring to FIG. 2, the radio network node determines whether there has been a cell change for a target UE, as shown at block 210. In various embodiments, one or several types of cell changes are detected by the radio network node, including, for example: a change of the serving cell; a change to a set of serving cells; a primary cell, PCell, change; a change in carrier for at least one cell; and an activation or deactivation of a cell or a carrier. In some cases, the detecting is carried out while positioning measurements are being performed on uplink transmissions from the target cell, either by the radio network node or by a separate measuring node. The uplink transmissions can be, for example, reference signal transmissions, such as sounding reference signals, or data transmissions, such as PUSCH transmissions, or control transmissions, such as PUCCH transmissions.

If a cell change is detected, as indicated by the arrow exiting block 210 and labelled "YES," the illustrated method continues with an optional step of determining whether positioning measurements can continue after the cell change, as shown in block 220. If all or a sufficient set of positioning measurements can continue, then there is no need for further action, and the radio network node returns to monitoring for additional cell changes, as indicated by the arrow exiting block 220 and labelled "YES."

As discussed above, positioning measurements for one or more uplink transmissions may be impossible to continue after a cell change for any of several possible reasons. In some cases, for example, the operation illustrated in block 220 may comprise determining that whether an uplink transmission is terminated due to the cell change, or whether sounding reference signals are configured on an old or new serving cell for the target UE. In various embodiments, one or both of these scenarios, as well as several others, may trigger a report to the positioning node, as discussed further below. It should be appreciated that the operation shown in block 220 is illustrated as optional since it is not necessarily implemented in all radio network nodes configured according to the techniques, nor is it necessarily performed in every instance in those radio network nodes that at least sometimes perform it.

If the operation shown in block 220 is not performed at all, or if positioning measurements cannot continue due to the cell change (as indicated by the "NO" arrow exiting block 220), then the illustrated process continues, as shown at block 230, with the radio network node informing a positioning node of the cell change. In some cases that may be done selectively, depending on the type of cell change. For instance, in some embodiments a cell change involving secondary cell changes may not trigger a report to the positioning node, while all serving cell changes do. In other embodiments, serving cell changes that do not result in the unavailability of one or more measured uplink transmissions will trigger a report to the positioning node, while all other types of cell changes do.

In some embodiments, informing the positioning node of the cell change includes informing the positioning node of a type of the cell change, e.g., whether the detected cell change is a change of the serving cell, a change to a set of serving cells, a change in PCell, a change in carrier for at least one cell, or an activation or deactivation of a cell or a carrier. Informing the positioning node of the cell change may also be done by providing the new/updated transmission configuration information for one or more cells to the positioning node, where the new/updated transmission configuration information for one or more cells is indicative of a cell change. For example, the information sent to the positioning node may include information regarding the PCell, regardless of whether measurements are performed on PCell or not. In such a case, for example, if the PCell information changes then it is obvious that a cell change occurred. In another example, in a non-CA system, the updated transmission configuration information might indicate transmissions on a different cell, thus indicating a cell change. In still another example, in a CA system, the updated transmission configuration in formation comprises SRS configuration on an SCell, while previously only SRS on PCell was indicated to positioning node. Once again, this may indicate that there has been a change in the set of serving cells.

In some of these and in some other embodiments, the radio network node sends an indication about an on-going positioning session to a target cell, such as when the cell change involves a handover to the target cell. This is illustrated at block 240, which is also labelled as optional, since it need not be implemented in every embodiment of the techniques described herein. In some cases, this indication about the on-going positioning session includes positioning QoS information for the target UE. Note that while this operation is illustrated below block 230 in FIG. 2, the indication about the ongoing positioning session can be sent to the target cell before the positioning node is informed of the cell change, in some embodiments. In this way, the new cell may receive most or all the necessary information for carrying out handover procedures, before the handover is actually finalized.

Figure 3:
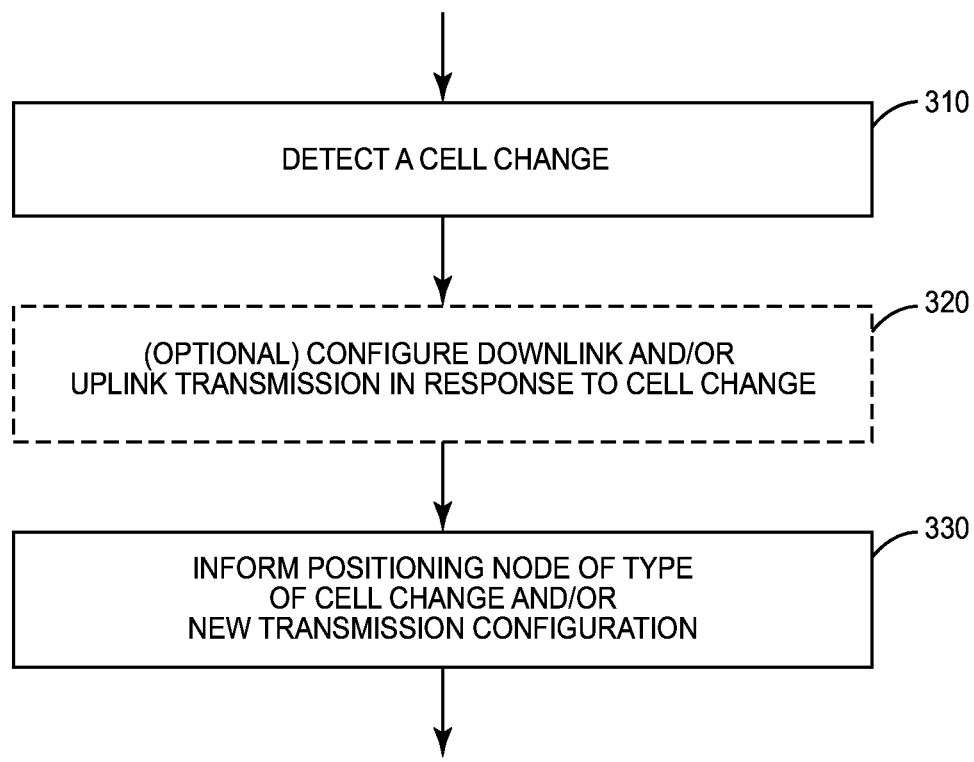

FIG. 3 illustrates a related process that might be implemented in a radio network node, such as an eNodeB or an LMU. As shown at block 310, the process begins with the detecting of a cell change. This cell change may be any of the types discussed above. For instance, in some cases this detecting may comprise receiving a handover command for the target wireless device from a second radio network node.

As shown at block 320, the method continues with an optional step of configuring a downlink and/or uplink transmission in response to the detected cell change. This may involve, for example, configuring SRS transmissions for the target UE in an on-going positioning session. As another example, this may involve a scheduling of downlink transmissions that takes into account potential interference to measurements of other downlink transmissions. As shown at block 330, the method continues with the radio network node informing a positioning node of the type of cell change, or the new transmission configuration, or both.

In some cases, the radio network node may receive an indication about an ongoing positioning session for the target wireless device, e.g., from a second radio network node. This may be received in conjunction with receiving a handover command for the target wireless device, for example. In these embodiments, the radio network node may be adapted to configure an uplink transmission, or a downlink transmission, or both, responsive to said indication. In some cases, the indication may comprise positioning QoS information, in which case the configuring of an uplink or downlink transmission may be based on the received positioning QoS information.

It should be appreciated that the technique illustrated in FIG. 3 can be readily combined with that shown in FIG. 2. For instance, the operations illustrated in blocks 320 and 330 can replace or supplement the operation shown in block 220 of FIG. 2.

Figure 4:
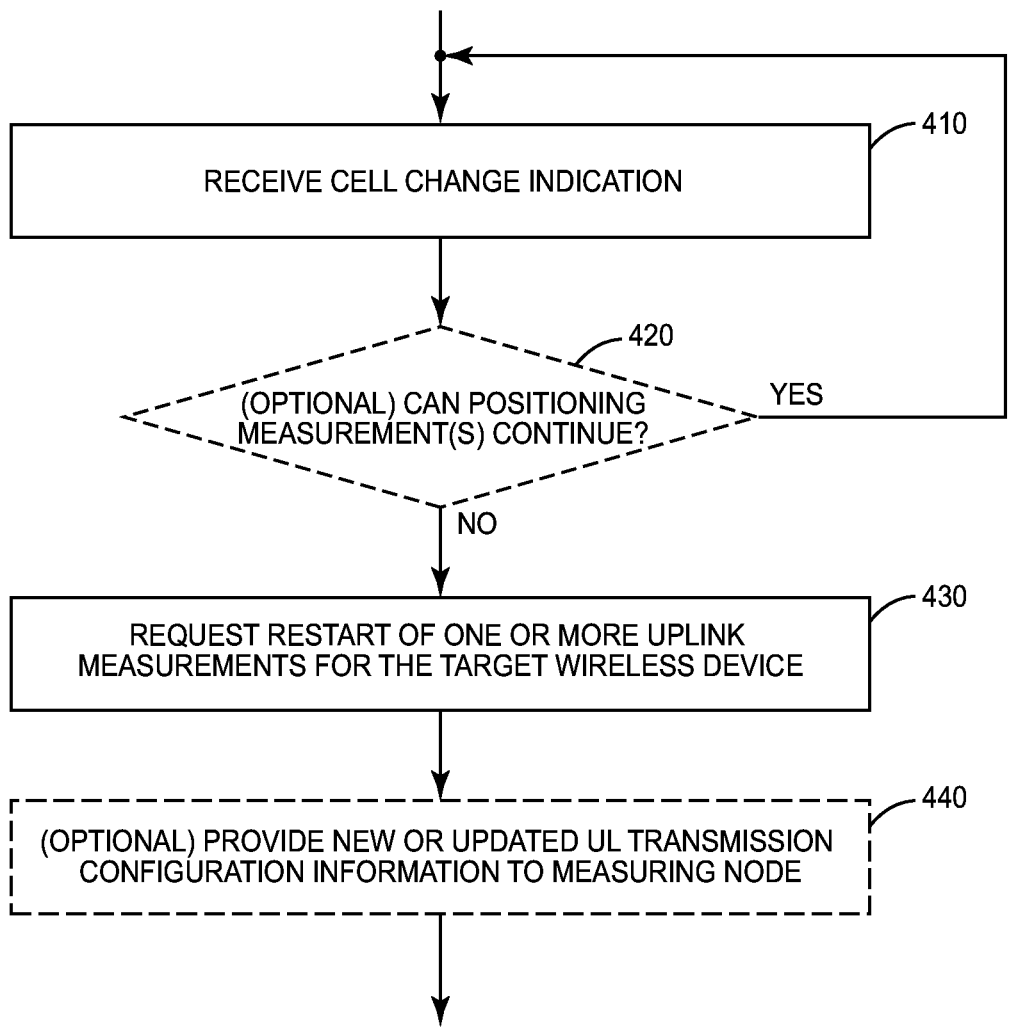

FIG. 4 illustrates, in general terms, a complementary method for assisting positioning of a target UE, as might be implemented in positioning node such as an E-SMLC. One again, the illustrated process can be used to ensure that positioning quality-of-service is maintained during and after a cell change.

The illustrated process begins, as shown at block 410, with the receiving of a cell change indication. This may be, for example, the informing of a cell change sent by a radio network node, as described above in connection with FIGS. 2 and 3. In some cases this may be sent directly from a radio network node, while in others it may be received via one or more intermediate nodes.

If The illustrated method continues with an optional step of determining whether positioning measurements can continue after the cell change, as shown in block 420. If all or a sufficient set of positioning measurements can continue, then there is no need for further action, and the illustrated process starts over, as indicated by the arrow exiting block 420 and labelled "YES."

As discussed above, positioning measurements for one or more uplink transmissions may be impossible to continue after a cell change for any of several possible reasons. In some cases, for example, the operation illustrated in block 420 may comprise determining that whether an uplink transmission is terminated due to the cell change, or whether no sounding reference signals are configured on an old or new serving cell for the target UE. This may be based on information provided as part of in association with the indication of the cell change, such as the type of cell change or a new uplink or downlink transmission configuration for a target UE. However, it should be appreciated that the operation shown in block 420 is illustrated as optional since it is not necessarily implemented in all positioning nodes configured according to these techniques, nor is it necessarily performed in every instance in those positioning nodes that at least sometimes perform it.

If the operation shown in block 420 is not performed at all, or if positioning measurements cannot continue due to the cell change, then the illustrated process continues, as shown at block 430, with a request to restart uplink positioning measurements for one or more uplink transmissions transmitted by the target UE. In some cases, positioning measurements for one configuration of uplink transmissions can continue, while positioning measurements for another configuration of uplink transmissions cannot, e.g., when reference signal transmissions on a given are terminated. In some cases, then, the positioning node selectively requests a restart of uplink positioning measurements for one or more UL transmissions, even after first determining that uplink positioning measurements for at least a first configuration of uplink transmissions can continue after the indicated cell change, where a restart of uplink positioning measurements for at least a second configuration of uplink transmissions is requested.

As shown at block 440, the illustrated process continues, in some embodiments, with the optional step of providing new or updated uplink transmission configuration information to a measuring node, such as an LMU. Once again, the operation shown in block 440 is illustrated as optional since it is not necessarily implemented in all positioning nodes configured according to the techniques described above, nor is it necessarily performed in every instance in those positioning nodes that at least sometimes perform it. In some embodiments, this operation is performed, but is not performed separately from the request to restart measurements shown in block 430. Rather, in these embodiments, the providing of new or updated uplink transmission configuration information serves as an implicit request to restart one or more uplink measurements for the target wireless device.

Although the techniques described above may be implemented in any appropriate type of telecommunication system, supporting any suitable communication standards and using any suitable components, particular embodiments of the described solutions may be implemented in an LTE network, such as that illustrated in FIG. 1.

The example network may further include any additional elements suitable to support communication between wireless devices or between a wireless device and another communication device (such as a landline telephone). Although each of the illustrated network nodes in FIG. 1 may represent a network communication device that includes any suitable combination of hardware and/or software, these network nodes may, in particular embodiments, represent a device such as the example network node 500 illustrated in FIG. 5. Similarly, although the illustrated base station nodes may represent network nodes that includes any suitable combination of hardware and/or software, these network nodes and other radio network nodes may, in particular embodiments, represent devices such as the example radio network node 600 illustrated in FIG. 6.

Figure 5:
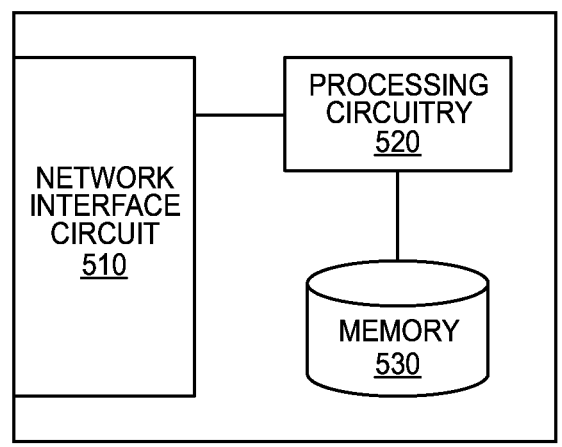
FIG. 5 is a block diagram illustrating several components of an example network node, such as a positioning node, according to some embodiments of the present invention.

As shown in FIG. 5, the example network node 500 includes processing circuitry 520, a memory 530, and network interface circuitry 510. In particular embodiments, some or all of the functionality described above as being provided by a network node may be provided by processing circuitry 520 executing instructions stored on a computer-readable medium, such as the memory 530 shown in FIG. 5. Alternative embodiments of the network node 500 may include additional components beyond those shown in FIG. 5 that may be responsible for providing certain aspects of the node's functionality, including any of the functionality described above and/or any functionality necessary to support the solution described above.

More particularly, embodiments of the present invention include a positioning node having a configuration like that illustrated in FIG. 5, e.g., including a network interface 510 adapted for communication with one or more other network nodes as well as processing circuitry 520, where the processing circuitry 520 is adapted receive, from a radio network node, an indication of a cell change for the target UE, and to selectively request a restart of uplink, UL, positioning measurements for one or more UL transmissions transmitted by the target UE, in response to said indication. It should be appreciated that the several variations described above for the process illustrated in FIG. 4 are equally applicable to a positioning node having the configuration shown in FIG. 5.

Figure 6:
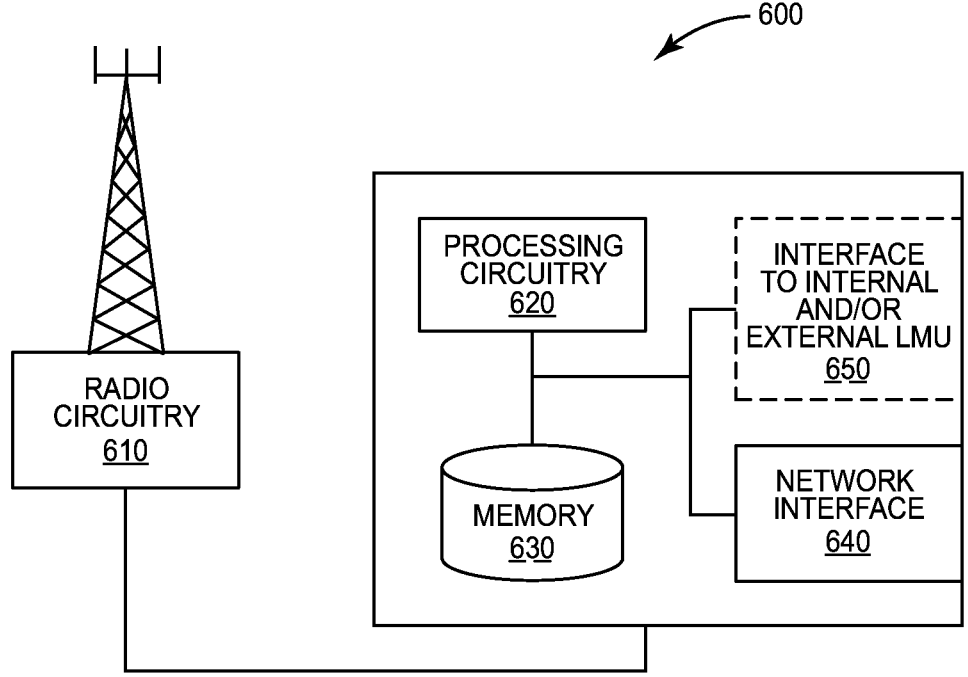
FIG. 6 illustrates components of an example radio network node according to several embodiments of the present invention.

As shown in FIG. 6, an example radio network node 600 includes processing circuitry 620, a memory 630, radio circuitry 610, and network interface circuitry 640. The processing circuitry 620 may comprise additional radio-frequency circuitry and baseband processing circuitry (not shown). In particular embodiments, some or all of the functionality described above as being provided by a mobile base station, a base station controller, a relay node, a NodeB, an enhanced NodeB, an LMU, and/or any other type of mobile communications node may be provided by the processing circuitry 620 executing instructions stored on a computer-readable medium, such as the memory 630 shown in FIG. 6. Alternative embodiments of the network node 600 may include additional components responsible for providing additional functionality, including any of the functionality identified above and/or any functionality necessary to support the solution described above.

For example, a radio network node 600 configured according to some embodiments of the present invention includes radio circuitry 610 adapted for radio communication with the target UE, a network interface 640 adapted for communication with one or more other network nodes, and processing circuitry 620, as shown in FIG. 6. More particularly, the processing circuitry 620 in several embodiments is adapted to detect a cell change for the target UE, and, in response to said cell change, inform a positioning node of the cell change, via the network interface 640. In other words, the processing circuitry 620 in radio network node 600 may be configured, in several embodiments of the invention, to carry out any or several of the methods described above in connection with FIGS. 2 and 3.

The radio network node 600 of FIG. 6 may be configured to operate as a base station according to Release 11 specifications for LTE, in some cases. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

In some cases, radio network node 600 includes an additional interface 650, adapted for communications with an internal or external LMU function, or both. This additional interface 650 may include circuitry and/or programmed logic that is additional to network interface 640, in some cases, or may comprise functionality added to the circuitry and/or programmed logic used to implement network interface 640. When configured as a base station, radio network node 600 may include an integrated LMU, or may share one or more components with an LMU, and/or may communicate with a standalone LMU via additional interface 650. In any of these cases, the processing circuitry 620 may be further configured to carry out the necessary communications between the base station functionality of radio network node 600 and the LMU functionality.

In other embodiments, radio network node 600 of FIG. 6 is configured to operate as an LMU or other radio signal measurement unit. In this case, radio network node 600 may include radio circuitry 610 that is adapted only for receiving and measuring uplink transmissions from UEs, in some cases. As noted earlier, an LMU may be integrated with an eNodeB, or share one or more components with an eNodeB, or may be standalone; in any of these cases, an LMU configured as shown in FIG. 6 is adapted to communicate with an eNodeB and/or a positioning node, e.g., using network interface 640.

Referring again to FIG. 6, it should be appreciated that radio circuitry 610 includes receiver circuits and/or transmitter circuits that use known radio processing and signal processing components and techniques, typically according to a particular telecommunications standard such as the 3GPP standard for LTE and/or LTE-Advanced. In some cases, radio network node may be a measurement node that includes only radio receiver circuitry, and not radio transmitter circuits. In either case, because the various details and engineering trade-offs associated with the design and implementation of such circuitry are well known and are unnecessary to a full understanding of the invention, additional details are not shown here.

Baseband & control processing circuit 620 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Again, because the various details and engineering tradeoffs associated with the design of baseband processing circuitry for wireless base stations and other wireless devices are well known and are unnecessary to a full understanding of the invention, additional details are not shown here.

Accordingly, in various embodiments of the invention, processing circuits, such as the processing circuits 620 of FIG. 6, are configured to carry out one or more of the techniques described above for assisting in the positioning of a target UE. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Several advantages may be achieved using the various techniques and apparatus described above. These advantages include, but are not limited to:

More accurate UL timing measurements for positioning and position calculation

LCS QoS information made available to the radio network node

Methods for using LCS QoS information by the radio network node are provided

Improved positioning QoS during a cell change

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a radio network node, for assisting a positioning node during positioning of a target wireless device, wherein said positioning is based on radio measurements of uplink (UL) radio signals transmitted by the target wireless device, the method comprising:
   detecting, at the radio network node, a cell change for the target wireless device; and,
   in response to said cell change, selectively informing a positioning node of the cell change, wherein said informing the positioning node of the cell change comprises providing the positioning node with new or updated configuration data for UL transmissions that are transmitted by the target wireless device in one or more cells.

2. The method of claim 1, wherein said selectively informing comprises informing the positioning node only when there is a change in the transmission configuration in at least one cell or when measurements of the UL radio signals cannot continue.

3. The method of claim 1, wherein the detected cell change comprises at least one of: a change of the serving cell; a change to a set of serving cells; a primary cell (PCell) change; a carrier change or carrier switching for at least one cell; a handover; and an activation or deactivation of a cell or a carrier.

4. The method of claim 1, wherein detecting the cell change comprises determining whether a UL transmission is terminated due to the cell change, and wherein the informing the positioning node of the cell change is performed in response to determining that the UL transmissions of the target wireless device for at least one cell are terminated due to the cell change.

5. The method of claim 1, wherein detecting a cell change further comprises determining whether or not positioning measurements can continue after the cell change, and wherein the informing the positioning node of the cell change is performed in response to determining that positioning measurements cannot continue after the cell change.

6. The method of claim 5, wherein determining that positioning measurements cannot continue after the cell change comprises determining that sounding reference signals are not configured on either an old or new serving cell for the target wireless device.

7. The method of claim 1, wherein said informing the positioning node of the cell change comprises informing the positioning node of a type of the cell change.

8. The method of claim 1, wherein said informing the positioning node of the cell change is performed based on a type of said cell change.

9. The method of claim 1, wherein said detecting the cell change occurs while positioning measurements are being performed on UL transmissions from the target wireless device, and wherein the UL transmissions comprise any one or more of: reference signal transmissions, data transmissions, and control channel transmissions.

10. The method of claim 1, wherein the cell change is to a target cell, and wherein the method further comprises sending an indication about an ongoing positioning session for the target wireless device to the target cell.

11. The method of claim 10, wherein sending the indication to the target cell comprises sending positioning quality-of-service (QoS) information for the target wireless device to the target cell.

12. The method of claim 1, wherein detecting the cell change for the target wireless device comprises receiving a handover command for the target wireless device from a second radio network node, the method further comprising:
   receiving an indication about an ongoing positioning session for the target wireless device, from the second radio network node; and
   configuring a UL transmission, or a downlink transmission, or both, responsive to said indication.

13. The method of claim 12, wherein said indication comprises positioning QoS information.

14. A method, in a positioning node engaged in an ongoing positioning session for a target wireless device, the method comprising:
   receiving at the positioning node, from a radio network node, an indication of a cell change for the target wireless device, wherein said indication comprises new or updated configuration data for uplink (UL) transmissions that are transmitted by the target wireless device in one or more cells; and
   selectively requesting a restart of UL positioning measurements for one or more UL transmissions transmitted by the target wireless device, in response to said indication.

15. The method of claim 14, wherein selectively requesting a restart of UL positioning measurements for one or more UL transmissions comprises determining that UL positioning measurements for at least a first configuration of UL transmissions can continue after the indicated cell change, and requesting a restart of UL positioning measurements for at least a second configuration of UL transmissions.

16. The method of claim 14, wherein said indication of a cell change for the target wireless device further comprises a type of cell change.

17. A radio network node configured to assist positioning of a target wireless device, wherein said positioning is based on radio measurements of uplink (UL) radio signals transmitted by the target wireless device, the radio network node comprising a network interface adapted for communication with one or more other network nodes, and processing circuitry adapted to:
  detect a cell change for the target wireless device; and,
  in response to said cell change, selectively inform a positioning node of the cell change, via the network interface, wherein said informing the positioning node of the cell change comprises providing the positioning node with new or updated configuration data for UL transmissions that are transmitted by the target wireless device in one or more cells.

18. The radio network node of claim 17, wherein the processing circuitry is configured to inform the positioning node of the cell change only when there is a change in the transmission configuration in at least one cell or when measurements of the UL radio signals cannot continue.

19. The radio network node of claim 17, wherein the processing circuitry is adapted to detect at least one of the following cell changes: a change of the serving cell; a change to a set of serving cells; a primary cell (PCell) change; a carrier change or carrier switching for at least one cell; a handover; and an activation or deactivation of a cell or a carrier.

20. The radio network node of claim 17, wherein the processing circuitry is further adapted to determine whether a UL transmission is terminated due to the cell change, and to inform the positioning node of the cell change in response to determining that the UL transmissions of the target wireless device for at least one cell are terminated due to the cell change.

21. The radio network node of claim 17, wherein the processing circuitry is further adapted to determine whether or not positioning measurements can continue after the cell change, and to inform the positioning node of the cell change in response to determining that positioning measurements cannot continue after the cell change.

22. The radio network node of claim 21, wherein the processing circuitry is adapted to determine that positioning measurements cannot continue after the cell change by determining that sounding reference signals are not configured on either a new or old serving cell for the target wireless device.

23. The radio network node of claim 17, wherein the processing circuitry is adapted to inform the positioning node of a type of the cell change.

24. The radio network node of claim 17, wherein the processing circuitry is adapted to inform the positioning node of the cell change based on a type of said cell change.

25. The radio network node of claim 17, wherein the processing circuitry is adapted to detect the cell change while positioning measurements are being performed on UL transmissions from the target wireless device, the UL transmissions comprising any one or more of: reference signal transmissions, data transmissions, and control channel transmissions.

26. The radio network node of claim 17, wherein the processing circuitry is adapted to, when the cell change is to a target cell, send an indication about an ongoing positioning session for the target wireless device to the target cell.

27. The radio network node of claim 26, wherein the processing circuitry is adapted to include positioning quality-of-service (QoS) information for the target wireless device in the indication sent to the target cell.

28. A positioning node, comprising a network interface adapted for communication with one or more other network nodes and processing circuitry, wherein the processing circuitry is adapted to:
  receive at the positioning node, from a radio network node, an indication of a cell change for the target wireless device, wherein said indication comprises new or updated configuration data for uplink (UL) transmissions that are transmitted by the target wireless device in one or more cells; and
  selectively request a restart of UL positioning measurements for one or more UL transmissions transmitted by the target wireless device, in response to said indication.

29. The positioning node of claim 28, wherein the processing circuitry is configured to selectively restart UL positioning measurements for fewer than all cells serving the target wireless device in response to determining that UL positioning measurements for one or more cells can continue after the cell change.

30. The positioning node of claim 28, wherein the processing circuitry is configured to determine that UL positioning measurements for at least a first configuration of UL transmissions can continue after the indicated cell change, and to selectively restart UL positioning measurements for at least a second configuration of UL transmissions in response to said determining.

31. The positioning node of claim 28, wherein said indication of a cell change for the target further includes a type of cell change.

* * * * *

UNITED STATES PATENT AND TRADEMARK OFFICE
CERTIFICATE OF CORRECTION

PATENT NO. : 9,516,570 B2  Page 1 of 1
APPLICATION NO. : 13/700823
DATED : December 6, 2016
INVENTOR(S) : Siomina It is certified that error appears in the above-identified patent and that said Letters Patent is hereby corrected as shown below:

In the Specification

In Column 13, Line 9, delete "0.127" and insert -- 0..127 --, therefor.

Signed and Sealed this
Eighteenth Day of April, 2017

Michelle K. Lee
*Director of the United States Patent and Trademark Office*